Patented July 12, 1927.

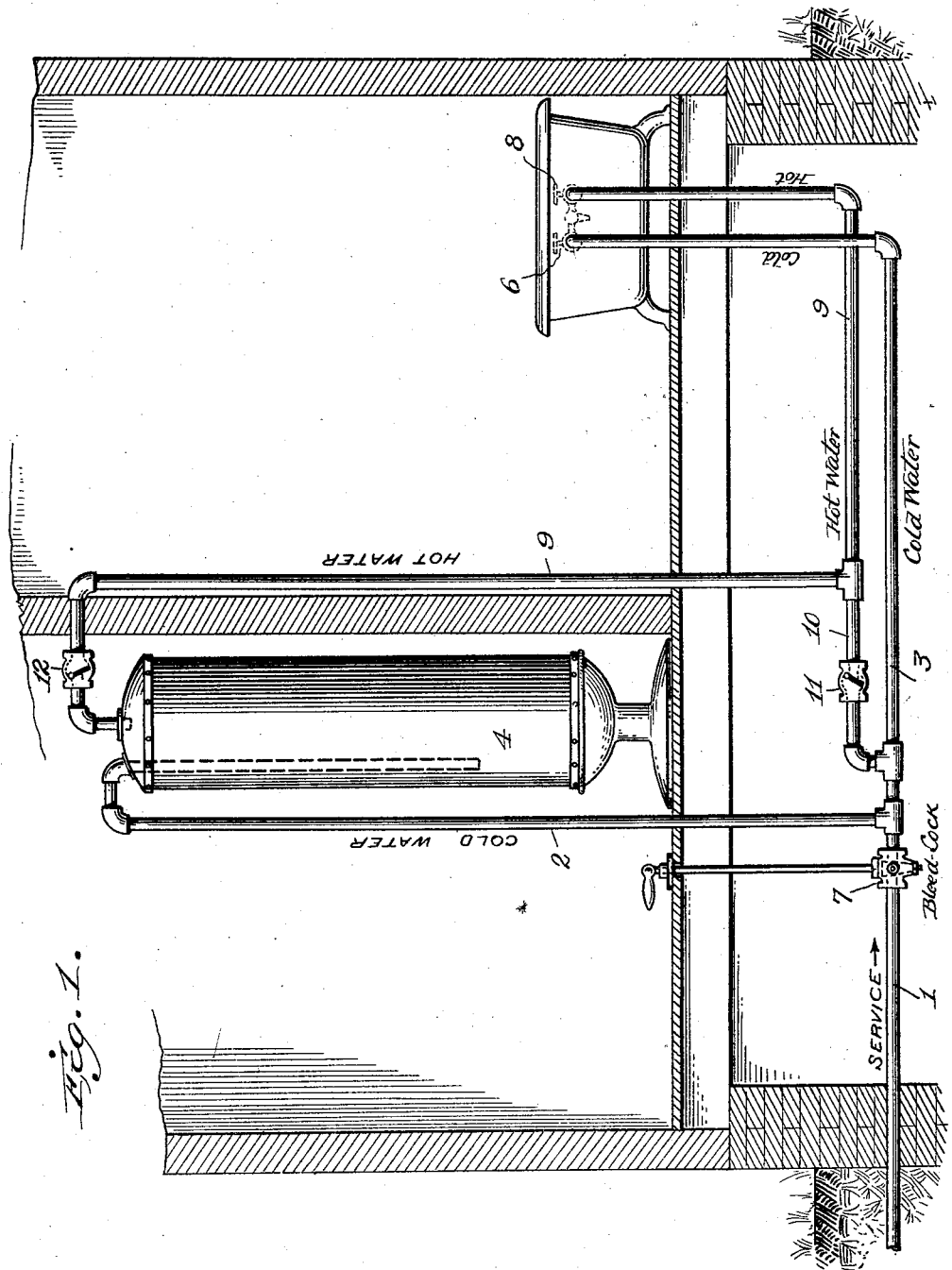

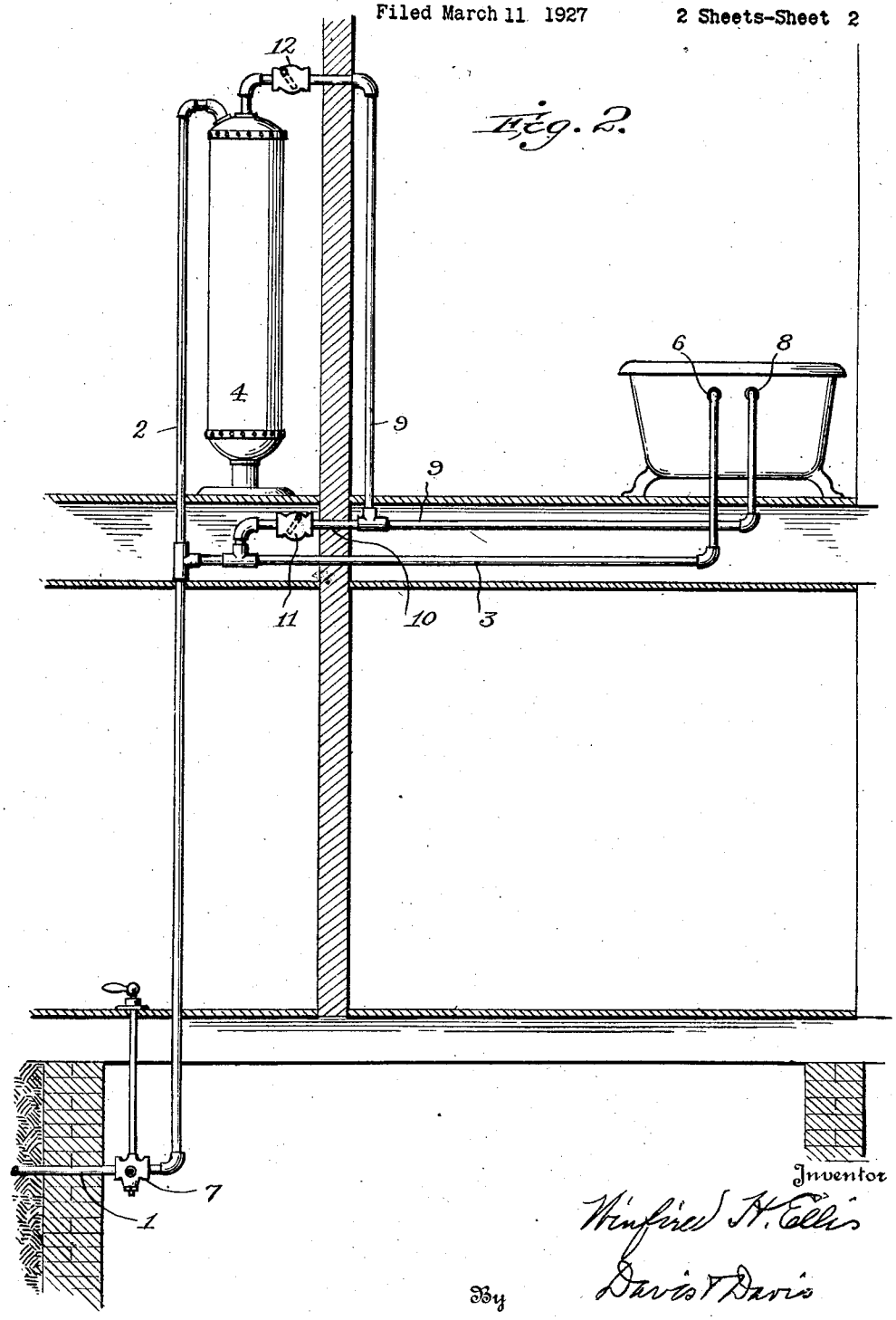

1,635,745

UNITED STATES PATENT OFFICE.

WINFIELD HUNTER ELLIS, OF LITTLE ROCK, ARKANSAS.

PLUMBING SYSTEM.

Application filed March 11, 1927. Serial No. 174,598.

The object of this invention is to provide simple and inexpensive as well as fool-proof means for draining the house piping system, both hot and cold pipes, to thereby avoid the troubles due to freezing, as more fully hereinafter set forth.

The drawing annexed, Fig. 1 is a diagram of a simple plumbing system illustrating my invention, and Fig. 2 is a similar diagram showing my invention applied to a second-floor plan.

Referring to the drawing annexed by reference-characters, 1 designates a service pipe which has branches 2 and 3 leading respectively to the boiler 4 and to the cold faucet 6. In the service pipe 1, at a point outside of the house branches, is located a single-way bleed-cock 7.

Connecting the top of the boiler to the hot spigot 8 is a hot-water pipe 9, and this hot-water pipe 9 is connected to one of the cold-water pipes (in this instance, pipe 3) by a by-pass pipe 10, in which is inserted a swing check-valve 11 of well-known type, which opens toward the cold water side and closes in the opposite direction. In the pipe 9, preferably close to the boiler, is located a smaller check-valve 12 which opens away from the boiler and closes in the opposite direction.

With this arrangement of pipes and valves, it will be seen that the entire house system of pipes may be drained through a single-way bleed-cock, thereby reducing to the utmost simplicity the installation of piping and the work of draining the system in freezing weather. It will be seen that the hot-water pipes drain out through the check-valve 11 and that the other pipes drain out by gravity in the usual manner. The check-valve 11 remains closed at all times except when the system is drained; this obviously prevents cold water entering the hot-water pipes. The other valve, 12, is for the purpose of preventing hot water flowing back into the boiler when the cold water is cut off at the bleed-valve, thereby maintaining at all times a high pressure in the hot-water pipes sufficient to open check-valve 11 should it become inactive from corrosion.

It will be understood, of course, that I have illustrated my invention as applied to the simplest possible hot-and-cold-water system for residences, and that the arrangement of piping and the location of the check-valves may be greatly varied without departing from my invention.

In Fig. 2 is illustrated my piping system applied to a second-floor plan, showing the advantage of feeding hot-water into the cold between the ceiling and floor, thus eliminating the necessity of a hot-water return to the ground and a hot-water bleed.

What I claim as new is:

1. A plumbing system embodying a service pipe, a boiler and a cold-water pipe connecting the service pipe to the boiler, hot and cold water faucets, a pipe connecting the cold-water faucet to the service pipe, a pipe connecting the hot-water faucet to the hot-water outlet of the boiler, this pipe being provided with a check-valve closing toward the boiler, a by-pass pipe connecting the hot-water pipe to one of the cold-water pipes and provided with a check-valve opening toward the cold-water side, and a single-way bleed-cock in said service pipe, whereby the entire piping system may be drained through said bleed-cock.

2. In a plumbing system, a service pipe, a boiler and a cold-water pipe connected to the service-pipe, a single-way bleed-cock in the service pipe ahead of said boiler connection, a cold-water faucet and a cold-water pipe connecting the same to the service pipe inside of the bleed-cock, a hot-water faucet and a hot-water pipe connecting the same to the hot-water outlet of the boiler, and a by-pass pipe connecting the hot-water pipe to one of the cold-water pipes at a point inside of the bleed-cock, this by-pass being provided with a check-valve opening toward the cold-water side.

In testimony whereof I hereunto affix my signature.

WINFIELD HUNTER ELLIS.